United States Patent Office 2,824,824
Patented Feb. 25, 1958

2,824,824
INSECT REPELLENT AND METHOD OF STABILIZING SAME

Lyle D. Goodhue, Bartlesville, and Kenneth E. Cantrel, Dewey, Okla., assignors to Phillips Petroleum Company, a corporation of Delaware No Drawing. Application May 11, 1955
Serial No. 507,743

21 Claims. (Cl. 167—33)

This invention relates to insect repellents. In one of its aspects the invention provides a stabilized pyridine dicarboxylic acid diester insect repellent containing coumarin and/or one of its derivatives. In another of its aspects, the invention relates to a method for repelling insects which comprises applying to the situs to be rendered repellent, a pyridine dicarboxylic acid diester repellent and at least one of coumarin and its derivatives. Other aspects and the advantages of the invention are apparent from this disclosure and the claims.

In Serial Number 240,602, filed August 6, 1951, now Patent Number 2,757,120, there are described and claimed a method and composition for repelling insects employing as an active ingredient at least one of the diethyl, di-n-butyl and di-n-propyl esters of pyridine dicarboxylic acids. The pyridine dicarboxylic acid diesters to which the present invention is applied are the compounds which are described in said Patent Number 2,757,120. In said copending application, laboratory test strips having been prepared with usulfured molasses and having been impregnated with the repellents there claimed, as described in Example I of that application, prevented feeding of flies even after 150 minutes at which time the test was ended. In Example II and elsewhere in that application, practical tests conducted in a stable gave repellencies for periods of two weeks. Therefore, it is clear that the repellents of said copending application possess highly desirable repellency, per se.

Among the objects of this invention is the provision of a method for extending the present effective length of time during which pyridine dicarboxylic acid diester repellents are effective to repel insects, such as flies. Also included among said objects is the provision of a composition containing at least one of said diesters and at least one of certain stabilizers as set forth herein.

It has now been discovered that coumarin and derivatives of coumarin of the following general structural formula are effective in stabilizing and extending the repellent life of the diethyl, di-n-butyl and the di-n-propyl esters of pyridine dicarboxylic acids when these compounds are exposed to sunlight or its equivalent.

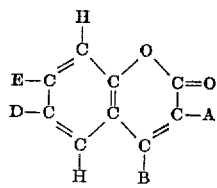

In the above formula, C is carbon, H is hydrogen, O is oxygen, A is one of hydrogen, bromine and chlorine, B is one of hydrogen and an alkyl radical containing not more than 3 carbon atoms, D is one of hydrogen, hydroxyl and a nitro radical, E is one of hydrogen, hydroxyl, an alkoxy radical containing not more than 3 carbon atoms and an amino group which can have its hydrogen substituted by not more than 2 alkyl groups containing not more than 3 carbon atoms and when E is an alkoxy radical, B is hydrogen.

Therefore, according to this invention, there have been provided a method and a composition for repelling insects, for example, flies, the composition being at least one of those as set forth and described herein. The invention is particularly applicable to the repelling of flies such as houseflies and is, therefore, described as applied to repelling of said insects.

The repellent compositions of this invention can comprise a mixture of the coumarin stabilizer material and a pyridine dicarboxylate dissolved in a suitable solvent or repellent adjuvant as a carrier. Solvents include acetone, hydrocarbons such as kerosene and naphthas, and other liquid hydrocarbons boiling preferably above atmospheric temperature. The preferred solvent is an isoparaffinic hydrocarbon having a boiling range of approximately 260 to 800° F. Solid inert carrier materials such as talc and kieselguhr can also used. The stabilized repellents of this invention can also be applied in the form of an aqueous emulsion or dispersion, preferably when a wetting or dispersing agent is employed in preparing such dispersions. It is within the scope of the invention and the claims appended hereto to apply the repellent and the stabilizer each of them separately to a surface.

The proportions in which the stabilizer and repellent are mixed or applied to a given surface can vary depending upon the surface to which the materials are applied and also upon the method of application. Preferably, the weight ratio of stabilizing material to the ester of pyridine dicarboxylic acid varies from 1:5 to 1:1 although the ratio can be as high as 1:20 and as low as 1:0.5. Combinations of more than one of the pyridine dicarboxylic repellents with one or more of the stabilizers are to be included within the scope of this invention. Although application to a surface is referred to in the description of the invention, it is clear that the invention includes within its scope and, therefore, the claims read on spray application to such a surface and/or on the spraying of the repellent composition into a space from which the insect is to be repelled.

The stabilized compositions of this invention are preferably applied to the surface which is to be protected in the form a very thin film. In general, 0.01 to 5 grams of the combination of active ingredients and stabilizer are deposited on each sq. ft. of surface from which flies are to be repelled. Preferably, from 0.1 to 3 grams are deposited, although larger or smaller amounts can be employed as desired. When employed in a carrier, the amount of stabilized material usually will be in the range of about 0.3 to 30% by weight of the carrier material, preferably between 0.5 and 15% by weight. When application is carried out by spraying into a space according to the invention, for example, when repelling flies from a space which is to be sealed against them after they have been repelled, the concentration and the total amount of composition can be adjusted to obtain repellency as desired.

Among the coumarin and coumarin derivatives which are effective stabilizers for the pyridine dicarboxylic acid fly repellents are 4-methyl-6,7-dihydroxycoumarin, 4-ethyl-7-hydroxycoumarin, 3-chloro-4-methyl-7-hydroxycoumarin, 6-nitrocoumarin, 7-methoxycoumarin, 4-methyl-6-hydroxycoumarin, 4-methyl-7-hydroxycoumarin, 4-methyl-7-diethylaminocoumarin, coumarin, 3-bromo-7-hydroxycoumarin, 4-n-propyl-6-hydroxycoumarin, 3-chloro-7-n-propoxycoumarin, 6-hydroxy-7-ethoxycoumarin, 3-chloro-6-nitrocoumarin, and 4-isopropyl-6-hydroxycoumarin.

EXAMPLE I

Repellency to house flies was determined by the sandwich bait method which is essentially that disclosed by L. B. Kilgore in Soap, June 1949. In accordance with this method, to a sheet of cardboard were applied two smooth, thin strips of unsulfured molasses about ⅜" wide and 3½" long leaving a margin of at least ¼" all around and a space of at least one inch between the strips. The prepared cardboard strips were then oven dried at 45° C. Strips of highly porous lens paper, 1" x 4" in dimension, were impregnated with the chemical to be tested as a fly repellent by immersing them in an acetone solution containing the desired quantity of the chemical and then allowing the strips to dry over a period of four to six hours. An impregnated strip was superimposed on each strip of molasses and was fastened in place by stapling it in place to the cardboard backing. The loose fibrous construction of the impregnated paper permits the flies to remove the molasses through it. The prepared strips were then exposed to about 150 house flies, *Musca domestica*, over five days old which had been starved for six hours. Counts of the number of flies feeding on the strips were taken periodically for 2½ or 2¾ hours.

The compounds (coumarins) of the present invention were tested by the method described above. In these tests, acetone solutions containing 0.5 percent by weight of the di-n-propyl ester of pyridine 2,5-dicarboxylic acid and 0.5 percent by weight of the compound to be tested were tested against an acetone solution containing 0.5 percent of the di-n-propyl pyridine dicarboxylate alone. In these runs, the strips being tested were first dried and then were exposed under a commercial sunlamp (GE Sunlight S-1) for four hours prior to exposing to the flies. The lamp was about nine inches from the strips and the temperature was maintained at about 100° F. by adjusting the sunlamp's position. This provided an accelerated test of the effect of sunlight upon the repellent. Thus, it is noted that the rather long time of repellency under the accelerated test conditions represents a considerably longer time of repellency under ordinary use conditions. The results of these runs are given below in Table I.

was dissolved in acetone in such a manner that the acetone solution contained 0.5% by weight of this coumarin derivative. This solution was then applied to a sandwich bait test strip by dipping. The treated strip was then dried for about four hours, after which it was exposed to flies in the same manner as the tests in Example I. In this run, the treated strip was not exposed to sunlight or a sun lamp. The results are expressed below in Table II.

*Table II*

| Time (Minutes) | Number of Flies Feeding |
|---|---|
| 5 | 14 |
| 15 | 50+ |
| 30 | 15 |
| 45 | Gone |

EXAMPLE III

A wettable powder formulation of a stabilized insect repellent was made up of 25 parts of di-n-propyl ester of pyridine-2,5-dicarboxylic acid, 12.5 parts of 4-methyl-7-hydroxycoumarin (beta-methylumbelliferone), 1.5 parts of Triton–X100 (an alkylaryl polyether alcohol), and 61 parts of Attasorb, a finely divided attapulgite clay. In preparing this formulation the 4-methyl-7-hydroxycoumarin was dissolved in dimethylformamide using a volume numerically equal to one-fifth of the total weight of the final amount of wettable powder and four-fifths of acetone on the same basis. The ester and Triton–X100 was then added and the Attasorb stirred in. This procedure deposited repellent and stabilizer uniformly on the clay particles. After evaporation of the solvents, the dry product was rubbed through a 60-mesh sieve to break up any lumps which may have been formed.

Repellent compositions suitable for spraying were prepared by dispersing known amounts of the wettable powder formulated as described above into known amounts of water so that the dispersion obtained contained known

*Table I*

COMPOUNDS TESTED*

[Figures represent number of flies feeding]

| Time (Min.) | 0.5R 0.5I | 0.5R | 0.5R 0.5II | 0.5R | 0.5R 0.5III | 0.5R | 0.5R 0.5IV | 0.5R | 0.5R 0.5V | 0.5R | 0.5R 0.5VI | 0.5R | 0.5R 0.5VII | 0.5R | 0.5R 0.5VIII | 0.5R 0.5IX |
|---|---|---|---|---|---|---|---|---|---|---|---|---|---|---|---|---|
| 5 | 0 | 0 | 0 | 5 | 0 | 19 | 0 | 10 | 0 | 1 | 0 | 7 | 0 | 17 | 1 | 4 |
| 15 | 0 | 4 | 2 | 7 | 3 | Gone | 2 | Gone | 0 | 4 | 0 | 11 | 0 | Gone | 0 | 4 |
| 30 | 0 | 3 | 1 | Gone | 4 | | 6 | | 5 | 7 | 0 | Gone | 0 | | 2 | 1 |
| 45 | 0 | Gone | 1 | | 1 | | 1 | | 4 | Gone | 0 | | 0 | | 0 | 3 |
| 60 | 0 | | 1 | | ½ Gone | | 1 | | 2 | | 0 | | 0 | | 1 | 3 |
| 75 | 0 | | 1 | | | | 0 | | 1 | | 2 | | 0 | | 2 | 0 |
| 90 | 0 | | ½ Gone | | | | 0 | | ¾ Gone | | 1 | | 0 | | 0 | 1 |
| 105 | 0 | | 0 | | | | 0 | | 3 | | 2 | | 0 | | 1 | 0 |
| 120 | 0 | | 0 | | | | 0 | | 1 | | 1 | | 1 | | Gone | 3 |
| 135 | 0 | | 0 | | 1 | | Gone | | 2 | | 1 | | 0 | | | 0 |
| 150 | 1 | | 2 | | Gone | | | | 1 | | 1 | | 0 | | | 1 |
| 165 | 0 | | Gone | | | | | | About Gone | | ¾ Gone | | 1 | | | Gone |

*R—di-n-propyl ester of pyridine-2,5-dicarboxylic acid.
I—4-methyl-6,7-dihydroxycoumarin.
II—4-ethyl-7-hydroxycoumarin.
III—3-chloro-4-methyl-7-hydroxycoumarin.
IV—6-nitrocoumarin.
V—7-methoxycoumarin.
VI—4-methyl-6-hydroxycoumarin.
VII—4-methyl-7-hydroxycoumarin.
VIII—4-methyl-7-diethylaminocoumarin.
IX—Coumarin.
"Gone" means that all of the molasses was consumed by the flies feeding thereon.

EXAMPLE II

A test was run to determine the degree of repellency shown by the coumarin repellent stabilizers. In this test, 4-methyl-7-hydroxycoumarin, an excellent stabilizer for pyridine dicarboxylate repellents as shown in Example I, percentages of the active repellent material, the di-n-propyl ester of pyridine-2,5-dicarboxylic acid. These dispersions were sprayed onto the walls of hog houses until runoff and the effect of these repellent dispersions toward house flies, normally quite numerous in these houses, was recorded.

The results of these tests are expressed below as Table III. The results are expressed as percent fly reduction, a figure obtained by the formula:

$$\left[1 - \left(\frac{\text{No. of flies on a treated house}}{\text{No. of flies on an untreated house}}\right)\right]100 = \text{percent fly reduction}$$

Table III

| Days After Spraying | Percent Fly Reduction | | |
|---|---|---|---|
| | Wt. Percent Active Ingredient in Dispersion | | |
| | 4% | 2% | 1% |
| 1 | 99.5 | 98.0 | 96.0 |
| 5 | 99.0 | 97.0 | 94.0 |
| 10 | 99.5 | 94.0 | 64.0 |
| 20 | 89.0 | 64.0 | 2.0 |

EXAMPLE IV

A series of runs were made in which a pyridine dicarboxylic acid diester repellent, the di-n-propyl ester of pyridine-2,5-dicarboxylic acid, was stabilized with various amounts of 4-methyl-7-hydroxycoumarin (beta-methylumbelliferone). The initial run was made employing a repellent to stabilizer ratio of 1:2. The amount of stabilizer was then decreased for each run until, in the final run, a repellent to stabilizer ratio of 16:1 was employed. In all these runs the weight percent of repellent present was constant (0.5%). In these tests, 1" x 4" strips of highly porous lens paper were impregnated with an acetone solution containing the desired amount of stabilizer and repellent, dried for a period of four to six hours, and exposed to a commercial sunlamp (GE Sunlight S-1) for four hours by the same method as was used in Example I. These treated strips were then stapled onto molasses treated cardboard strips and tested by the sandwich bait method as described in Example I.

In these runs a new colony of houseflies was employed, so controls were run to determine the effectiveness of the non-stabilized repellent. This was done because of the inherent differences of strength and vitality of different colonies of flies.

The results of these tests prove conclusively the superiority of the stabilized repellents. In all of the runs, the stabilized repellent was still effective at 150 minutes' exposure to flies, the point at which the tests were discontinued. The non-stabilized repellents were much less effective, as for example, the comparative control for the run in which a 16:1 ratio was used was completely gone or consumed by the flies in 60 minutes.

Again it is noted that the rather long time of repellency under these accelerated test conditions represents a considerably longer time of repellency under ordinary use conditions.

EXAMPLE V

A stabilized repellent composition, composed of a 1:1 ratio of the di-n-propylester of pyridine-2,5-dicarboxylic acid and 4-methyl-7-hydroxycoumarin (beta-methylumbelliferone), was tested for its effectiveness as a repellent for house flies after exposure to a sunlamp (GE Sunlight S-1) for varying periods of time. The method of exposure and the testing of these materials in these runs was identical to the procedure used in Examples I and IV. The results of these tests are expressed below as Table IV.

Table IV

STABILIZED REPELLENT EXPOSED TO ARTIFICIAL SUNLIGHT FOR VARIOUS PERIODS OF TIME

| Exposure Period (Hours) | Compounds* | Concentration of Dipping Solution (Weight Percent in Acetone) | | Number of Flies Feeding After X Minutes | | | | | | | |
|---|---|---|---|---|---|---|---|---|---|---|---|
| | | Compound R | Compound VII | 5 | 15 | 30 | 45 | 60 | 90 | 120 | 150 |
| 4 | R+VII | 0.5 | 0.5 | 0 | 0 | 1 | 0 | 1 | 1 | 1 | 1 |
|   | R | 0.5 | | 0 | 1 | 1 | 1 | 6 | 0 | 1 | gone |
| 8 | R+VII | 0.5 | 0.5 | 3 | 0 | 1 | 1 | 0 | 1 | 1 | 0 |
|   | R | 0.5 | | 11 | 15 | 2 | 1 | 2 | gone | | |
| 12 | R+VII | 0.5 | 0.5 | 1 | 7 | 1 | 1 | 0 | 4 | 0 | gone |
|    | R | 0.5 | | 11 | 9 | 14 | 7 | 5 | 8 | gone | |
| 16 | R+VII | 0.5 | 0.5 | 0 | 3 | 4 | 5 | 3 | 2 | 3 | gone |
|    | R | 0.5 | | 7 | 13 | gone | | | | | |

*R—di-n-propyl ester of pyridine-2,5-dicarboxylic acid.
VII—4-methyl-7-hydroxycoumarin (beta-methylumbelliferone).

In the above tests a new colony of flies was used so controls were run to determine the effectiveness of the non-stabilized repellent as different colonies of flies have inherent differences of strength and vitality. It will be noted that in each case the stabilized compositions were effective for longer periods than the unstabilized controls.

From the foregoing disclosure, it is evident that the stabilizers of the present invention are preeminently suited to a stabilization of the specific pyridine dicarboxylic acid diesters, as set forth and described. The tests performed with a commercial sun lamp have been indicated to be more drastic than those which would employ natural sunlight. The point is that the repellent constituent of the composition of the invention can be applied to yield considerably better results than the rather good results which are indicated by the table. Clearly, in carrying out the invention, in a practical manner, ordinary sunlight will be the life-shortening influence ordinarily encountered.

Variation and modification are possible within the scope of the foregoing disclosure and the appended claims to the invention, the essence of which is that coumarin and its derivatives, as set forth and described herein, have been found to be excellent stabilizers for the pyridine dicarboxylic acid diesters, also as set forth and described herein, imparting to the compositions containing at least one of said coumarin and/or its derivatives and said esters unusual stability in the presence of sunlight or its equivalent.

We claim:
1. A method for stabilizing a diester of pyridine dicarboxylic acid having insect repellent properties which comprises compounding a coumarin therewith.
2. A stabilized diester of pyridine dicarboxylic acid insect repellent which contains as an essential stabilizing ingredient a coumarin.
3. A method of stabilizing an insect repellent composition comprising as an essential ingredient a compound selected from the group consisting of the diethyl-, di-n-propyl-, and di-n-butyl esters of pyridine-2,5-dicarboxylic acid and mixtures thereof which comprises adding thereto a compound selected from the group consisting of compounds having the formula

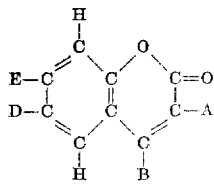

and mixtures of said compounds wherein A is one of hydrogen, bromine and chlorine, B is one of hydrogen and an alkyl radical containing not more than three carbon atoms, D is one of hydrogen, hydroxyl and a nitro radical, and E is one of hydrogen, hydroxyl, an alkoxy radical containing not more than three carbon atoms, and an amino group in which the hydrogen is substituted by not more than two alkyl groups containing not more than three carbon atoms and when E is an alkoxy radical, B is hydrogen.

4. A method according to claim 3 in which the weight ratio of the stabilizing compound to the ester of pyridine dicarboxylic acid is in the range of 1:5–1:1.
5. A composition according to claim 10 in which the repellent adjuvant is an isoparaffinic hydrocarbon having a boiling range in the range of approximately 260–800° F.
6. A method according to claim 3 in which the weight ratio of the stabilizing compound to the ester of pyridine dicarboxylic acid is in the range 1:20–1:0.5.
7. An insect repellent composition comprising as an essential active ingredient a compound selected from the group consisting of diethyl-, di-n-propyl-, di-n-butyl esters of pyridine-2,5-dicarboxylic acid and mixtures thereof and a stabilizing proportion of a compound selected from the group consisting of compounds having the formula

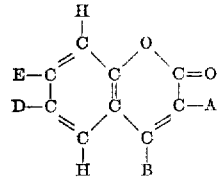

and mixtures of said compounds wherein A is one of hydrogen, bromine and chlorine, B is one of hydrogen and an alkyl radical containing not more than three carbon atoms, D is one of hydrogen, hydroxyl and a nitro radical, and E is one of hydrogen, hydroxyl, an alkoxy radical containing not more than three carbon atoms, and an amino group in which the hydrogen is substituted by not more than two alkyl groups containing not more than three carbon atoms and when E is an alkoxy radical, B is hydrogen.

8. A stabilized fly repellent composition according to claim 7 wherein are included a dispersing agent and a finely divided clay.
9. A composition according to claim 7 in which the ratio of the compound to the ester of pyridine dicarboxylic acid is in the range 1:20–1:0.5.
10. A composition according to claim 13 in which the active ingredient and stabilizing compound admixed in the selected proportion, are dispersed in a repellent adjuvant.
11. A method for repelling flies which comprises applying to the locus from which the flies are to be repelled a pyridine-2,5-dicarboxylic acid ester fly repellent stabilized with a coumarin.
12. A stabilized fly repellent composition comprising as an essential active ingredient at least one of the diethyl-, di-n-propyl-, di-n-butyl esters of pyridine-2,5-dicarboxylic acid and as stabilizer therefor a stabilizing amount of 4-methyl-6,7-dihydroxycoumarin.
13. A fly repellent composition according to claim 12 in which the ratio of stabilizing compound to the repellent ester is in the range of 1:20–1:0.5.
14. A stabilized fly repellent composition comprising as an essential active ingredient at least one of the diethyl-, di-n-propyl-, di-n-butyl esters of pyridine-2,5-dicarboxylic acid and as stabilizer therefor a stabilizing amount of 4-ethyl-7-hydroxycoumarin.
15. A fly repellent composition according to claim 14 in which the ratio of stabilizing compound to the repellent ester is in the range of 1:20–1:0.5.
16. A stabilized fly repellent composition comprising as an essential active ingredient at least one of the diethyl-, di-n-propyl-, di-n-butyl esters of pyridine-2,5-dicarboxylic acid and as stabilizer therefor a stabilizing amount of 3-chloro-4-methyl-7-hydroxycoumarin.
17. A fly repellent composition according to claim 16 in which the ratio of stabilizing compound to the repellent ester is in the range 1:20–1:0.5.
18. A fly repellent composition according to claim 21 in which the ratio of stabilizing compound to the repellent ester is in the range 1:20–1:0.5.
19. A stabilized fly repellent composition comprising as an essential active ingredient at least one of the diethyl-, di-n-propyl-, di-n-butyl esters of pyridine-2,5-dicarboxylic acid and as stabilizer therefor a stabilizing amount of 4-methyl-6-hydroxycoumarin.
20. A fly repellent composition according to claim 19 in which the ratio of stabilizing compound to the repellent ester is in the range 1:20–1:0.5.
21. A stabilized fly repellent composition comprising as an essential active ingredient at least one of the diethyl-, di-n-propyl-, di-n-butyl esters of pyridine-2,5-dicarboxylic acid and as stabilizer therefor a stabilizing amount of 4-methyl-7-hydroxycoumarin.

References Cited in the file of this patent

Chem. Abstr., vol 44, 1950, p. 6569c.

O. S. R. D.—Insect Control Committee Rpt. #28, Interim Rpt. 0–94, May 18, 1945; pub. August 1, 1947, 50 pp. plus 1 p. index; see esp. p. 36, Orlando #4861 (coumarin-phthalide mixture) and p. 41, Orlando #8085 (4 methyl-7 hydroxycoumarin); also pp. 1–4, 9, 16, and 21 for method of use.

UNITED STATES PATENT OFFICE
CERTIFICATE OF CORRECTION

Patent No. 2,824,824                          February 25, 1958

Lyle D. Goodhue et al.

It is hereby certified that error appears in the printed specification of the above numbered patent requiring correction and that the said Letters Patent should read as corrected below.

Column 7, line 32, claim 3, and line 65, claim 7, after "atoms," each occurrence, insert -- an amino group --.

Signed and sealed this 2nd day of September 1958.

(SEAL)
Attest:
KARL H. AXLINE
Attesting Officer

ROBERT C. WATSON
Commissioner of Patents